United States Patent [19] [11] 4,132,220

Thomason [45] Jan. 2, 1979

[54] SOLAR ENERGY COLLECTOR

[76] Inventor: Harry E. Thomason, 6802 Walker Mill Rd., SE., Washington, D.C. 20027

[21] Appl. No.: 682,968

[22] Filed: May 4, 1976

[51] Int. Cl.[2] .................... F24J 3/02

[52] U.S. Cl. .................... 126/271; 126/270

[58] Field of Search .................... 126/270, 271; 237/1 A; 165/171, 173, 174

[56] References Cited

U.S. PATENT DOCUMENTS

| | | | |
|---|---|---|---|
| 3,076,450 | 2/1963 | Gough et al. | 126/271 |
| 3,399,664 | 9/1968 | Suhay | 126/271 |
| 3,965,887 | 6/1976 | Gramer | 126/271 |
| 3,987,784 | 10/1976 | Godrick | 126/271 |
| 3,989,031 | 11/1976 | Thomason et al. | 126/271 |
| 4,003,363 | 1/1977 | Grossman | 126/271 |
| 4,008,708 | 2/1977 | Hagarty | 126/271 |
| 4,018,211 | 4/1977 | Barr | 126/271 |
| 4,026,268 | 5/1977 | Bartos et al. | 126/271 |

*Primary Examiner*—Kenneth W. Sprague
*Assistant Examiner*—James C. Yeung
*Attorney, Agent, or Firm*—Harry E. Thomason

[57] ABSTRACT

Simplicity is the height of invention. Glazing is simplified and reduced in cost by substantially eliminating framework for glass or other glazing material. And yet, long-life is retained, by use of an adhesive-sealant to secure the glazing to the solar absorber sheet. Differential expansion and contraction of parts does not break the glass or other glazing, or rupture metals, or crack rigid plastics.

5 Claims, 4 Drawing Figures

2
1'
9
2
9
1
3
9
7
8
5
14
2

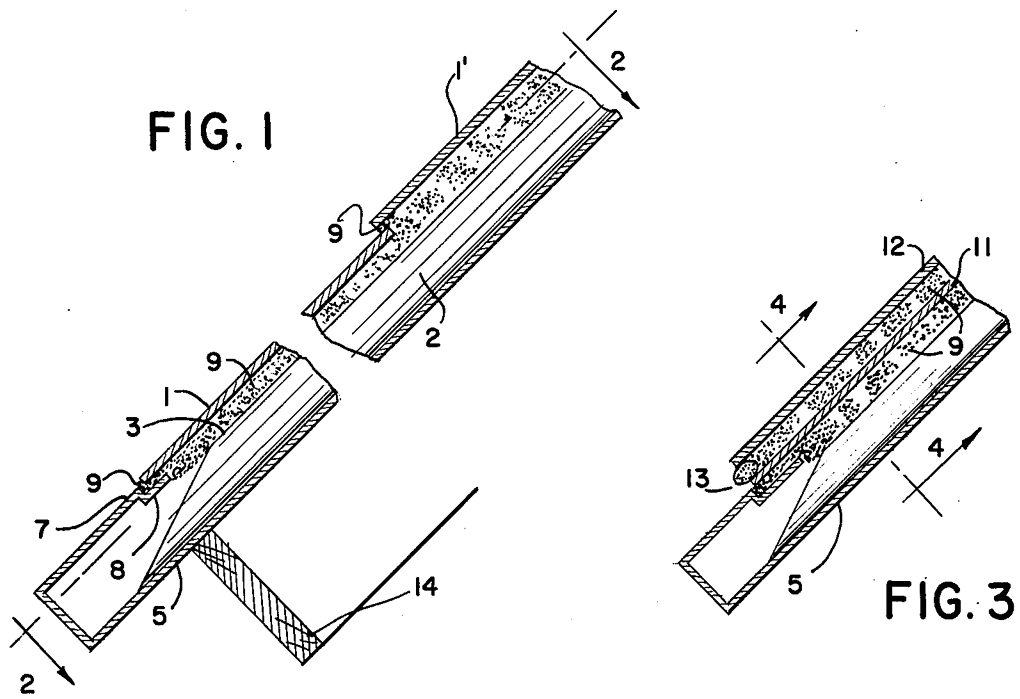
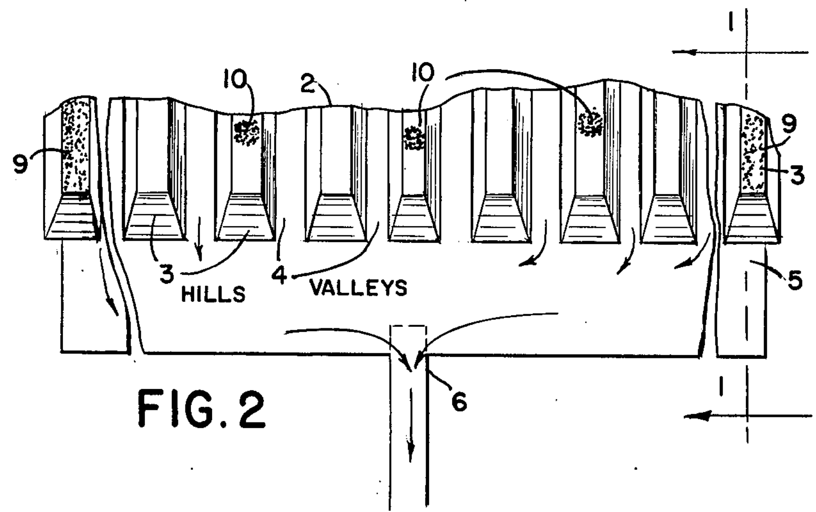
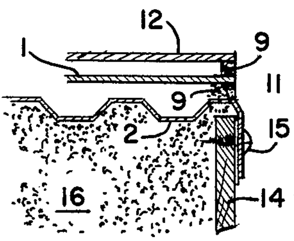
FIG. 4

SOLAR ENERGY COLLECTOR

BACKGROUND

In Thomason Patents, such as U.S. Pat. Nos. 3,145,707 and 3,215,134, the low-cost open-flow (trickle-flow) solar collector brought about low-cost solar heat collection. Many solar heated homes used that simple basic invention.

Quality was improved and high efficiency was achieved by the invention disclosed in Thomason U.S. Pat. No. 3,989,031. Panels embodying that invention were placed on the market under the trade name of Thomason "SOLARIS".

And yet, improvement and lower cost could be achieved. The thin aluminum frame (illustrated at 6 in U.S. Pat. No. 3,989,031) and the gasket seal (illustrated at 7) have been eliminated with a considerable reduction in cost.

IN THE DRAWING

FIG. 1 is a cross sectional cut through a portion of a solar heat collector panel along line 1—1 of FIG. 2.

FIG. 2 is a partial plan view along 2—2 of FIG. 1.

FIG. 3 is a cross sectional view similar to FIG. 1 illustrating the present invention as applied to a solar collector with double glazing.

FIG. 4 is a detail along line 4—4 of FIG. 3.

FIG. 1 illustrates glazing material 1, 1' (glass or clear plastic, for example) over a solar heat collector (absorber) sheet 2. The absorber sheet 2 is preferably corrugated aluminum or the like having hills 3 and valleys 4 running from top-to-bottom. In one preferred pattern, those hills are flattened, and the valleys are flattened. They are embossed for better spreading of the water across the flat valleys.

At the bottom end of the collector panel there is a transition area 5. That area is preferably formed into a collector manifold or trough (gutter) having an outlet 6. The corrugated hills and valleys flatten out at the transition area where the collector manifold is formed. The manifold is formed somewhat as illustrated at 7, 8 to receive adhesive-sealant 9 and glass or other glazing material 1.

The adhesive-sealant 9 (G.E. Silicone, for example) is also applied along each edge of the collector panel, substantially from top-to-bottom, to secure the glazing to the absorber and to form a gasket-seal between them.

Overlapping panes of glazing are illustrated at 1 and 1' with adhesive sealant 9 therebetween.

Little dabs of adhesive 10 may be applied at spots on the hills to secure the absorber and glazing together. Or, a substantially continuous bead may be applied from one side of the panel to the other, preferably applied to glazing 1 so as to rest on the hills of absorber 2.

The dab or the bead may be used as an adhesive to secure the parts together. Or, the dabs or beads, or both, may be attached to the glazing only, or to the absorber only. Then it (they) serve to keep the absorber from coming in direct contact with the glazing. This is important because the absorber 2 will be hotter than boiling water during hot summer days if no water is flowing through the collector panel. That hot absorber could damage, crack or shatter glazing 1.

FIG. 3 illustrates double glazing 11 and 12. A bead of material 13 is preferably used between glazing 11 and glazing 12. Adhesive-sealant 9 is also used.

FIG. 4 illustrates simple apparatus for securing absorber sheet 2 to frame 14. Sheet 2 may extend down alongside of frame 14 and be attached thereto by screws 15, or such. Insulation 16 reduces escape of heat from the rear side of absorber 2.

METHOD OF FABRICATION

There are several adhesive-sealants available. One is G.E. Silicone, available as clear calking or colored calking. After being extruded from a calking gun tube the Silicone begins to set up or cure. It reaches certain degrees of rigidity (under specified ambient conditions) in five minutes, ten minutes, fifteen minutes, and so on. It never becomes hard, always remaining semi-soft and rubber-like. Life expectancy is said to be in excess of 30 years.

The Silicone is soft and easily squished as it is extruded from the calking gun. It adheres readily to products such as glass or transparent plastics 1, 1', 11, 12, and aluminum or coated solar heat collector absorbers 2, and so on. Therefore, in fabricating a solar heat collector panel beads may be laid out and parts assembled quickly, or after a pre-determined degree of cure has occured. If assembled quickly, much of the Silicone will be squeezed from between the parts and a thin gasket-seal will be formed. After a number of minutes the Silicone is still tacky (sticky) but less fluid. Therefore, a thicker gasket-seal is formed.

If a bead or dab is deposited on the absorber, or on a piece of glazing, it adheres tenaciously. If allowed to stand for 30 to 60 minutes (more-or-less) it becomes non-tacky and does not stick to another object. So, the same product may be used for different purposes. It can be used as a spacer to prevent contact between hot and cooler parts. It can be formed thicker or thinner. It can cement the parts together, or not. Because it is always rubber-like, it allows for unequal expansion and contraction between parts without them tearing each other apart.

Beads, as illustrated at 13, may be formed at low cost to serve as spacers between parts, such as glass, or between glass and aluminum, or other. By installing outer glazing 12 over glazng 11, at just the right time, bead 13 will be just rigid enough to serve as a spacer and just tacky enough to cement the parts together. Of course sealant-cement 9 also secures the parts together.

Yes, simplicity and low cost are achieved by the present invention. Preglazed thin aluminum frame panels and gaskets, somewhat as illustrated at 7, 13 in U.S. Pat. No. 3,989,031, cost about a dollar a square foot of collector (those collectors sell at $3 to $4 per sq. ft.). With the present invention the cost is reduced to about half a dollar a square foot. A solar heated home should use about 250 to 1,000 sq. ft. of collectors. Therefore, the present invention can save about $125 to $500 per home, a sizable saving. In an area near the sea shore, the present invention is even more important. There they have the problem of a corrosive atmosphere (salt spray), which could damage or corrode metal trim on solar collectors. The present invention reduces or eliminates the problem. Glass and Silicone, as taught herein, are not quickly destroyed by salt spray.

I claim:

1. Solar heat collector apparatus comprising a substantially rigid solar absorber, substantially transparent glazing material above said absorber to admit solar energy to said absorber for conversion to heat energy, a flexible adhesive material forming support means, said glazing material being supported substantially entirely by said absorber through said support means, said adhesive material comprising a bonding type of material serving as the only means to secure said glazing material to said substantially rigid absorber, and said flexible adhesive material serving as a spacer to prevent direct contact and to allow for movement due to unequal expansion and contraction between said glazing and said substantially rigid absorber to minimize damage to said absorber and glazing due to expansion and contraction as a result of temperature cycling and heat extremes in said apparatus, said absorber and adhesive material assisting in support of said glazing and said glazing lending strength to said absorber in sandwich-like fashion.

2. Apparatus as in claim 1, said adhesive material also forming a gasket or seal between said absorber and said glazing.

3. Apparatus as in claim 1, said substantially transparent glazing material comprising two or more glazing sheets, and adhesive-sealant securing said sheets together and substantially sealing them to one-another.

4. Apparatus as in claim 1, said absorber comprising said adhesive securing said glazing to said absorber at various spots or small areas.

5. Apparatus as in claim 1, said absorber comprising corrugated material with hills and valleys, and a transition area and gutter-trough, said adhesive material securing said glazing to said gutter-trough.

* * * * *